United States Patent

Hugl et al.

[11] 4,439,372
[45] Mar. 27, 1984

[54] PROCESS FOR THE PREPARATION OF STYRYL DYESTUFFS

[75] Inventors: Herbert Hugl, Bergisch-Gladbach; Gerhard Wolfrum, Leverkusen; Klaus-Friedrich Lehment, Odenthal, all of Fed. Rep. of Germany

[73] Assignee: Bayer Aktiengesellschaft, Leverkusen, Fed. Rep. of Germany

[21] Appl. No.: 392,493

[22] Filed: Jun. 28, 1982

[30] Foreign Application Priority Data

Jul. 16, 1981 [DE] Fed. Rep. of Germany ....... 3128159

[51] Int. Cl.³ .......................................... C07C 121/80
[52] U.S. Cl. ........................... 260/465 E; 260/465 D
[58] Field of Search .................................... 260/465 E

[56] References Cited

U.S. PATENT DOCUMENTS

| | | | |
|---|---|---|---|
| 2,206,108 | 7/1940 | Muller et al. | 260/465 E |
| 2,583,551 | 1/1952 | Dickey et al. | 260/465 D |
| 2,798,090 | 7/1957 | Krell et al. | 260/465 E X |
| 4,132,840 | 1/1979 | Hugl et al. | 521/167 |

Primary Examiner—Dolph H. Torrence
Attorney, Agent, or Firm—Sprung, Horn, Kramer & Woods

[57] ABSTRACT

Process for the preparation of styryl dyestuffs of the formula

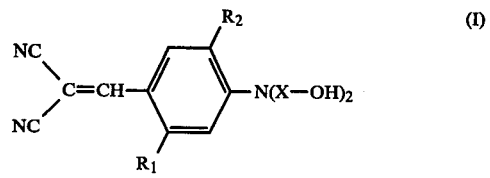

in which
  $R_1$ and $R_2$ denote hydrogen, alkyl, alkoxy or halogen and
  X denotes an alkylene radical,
characterized in that compounds of the formula

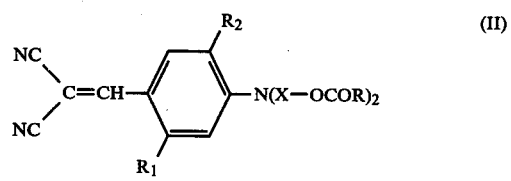

in which
  X, $R_1$ and $R_2$ have the meaning given for formula (I) and
  R denotes alkyl or aryl,
are hydrolyzed by means of mineral acid to give compounds of the formula (I) and the latter are isolated.

12 Claims, No Drawings

PROCESS FOR THE PREPARATION OF STYRYL DYESTUFFS

The invention relates to a process for the preparation of styryl dyestuffs of the formula

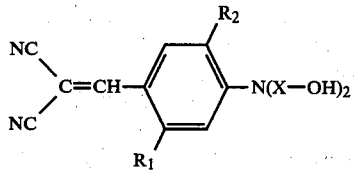

in which $R_1$ and $R_2$ denote hydrogen, alkyl, alkoxy or halogen and

X denotes an alkylene radical.

Dyestuffs of the formula (I) are known, for example from U.S. Pat. Nos. 2,206,108, 2,583,551 and 2,798,090. They are suitable for dyeing, by various dyeing and printing processes, polyester, cellulose alkyl ester, polyamide and polyacrylonitrile fibres. The dyestuffs of the formula (I) are very particularly valuable for the colouring of polyurethane plastics according to U.S. Pat. No. 4,132,840.

Hitherto, only the process described in the above-mentioned U.S. Patent Specifications has been known for the preparation of dyestuffs of the formula (I). In this process, bis-(2-hydroxyethyl)-anilines are reacted with formaldehyde and 3-nitrobenzenesulphonic acid in the presence of large amounts of elemental iron and concentrated mineral acid to give anils of the formula A, for example

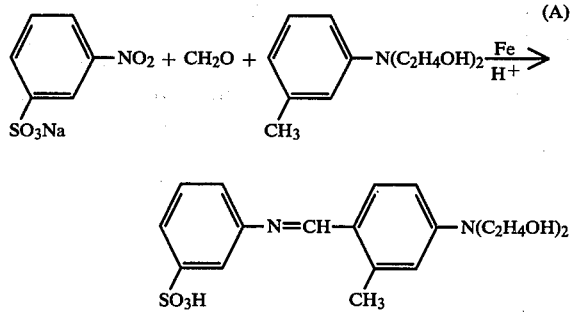

The compound of the formula (A) is then converted by heating with malonic dinitrile into the dyestuff of the formula (I) with $R_1=CH_3$, $R_2=H$ and $X=CH_2CH_2-$.

The yield is low and depends strongly on the quality of the iron shavings used. Particularly when using the dyestuff (I) for colouring polyurethane plastics, the persistently adhering iron salts interfere, so that expensive purification operations, for example recrystallisation from an organic solvent, are necessary.

A variation of this process as well as a discussion of other possible syntheses are described in the Journal of the Society of Dyers and Colorists, issue 4 (1977), on pages 126, 127 and 128. In this variation the reduction is carried out with zinc dust instead of with iron. Even in this case the yield is low and the dyestuff is contaminated with zinc salts.

The process according to the invention for the preparation of dyestuffs of the formula (I) is characterised in that compounds of the formula

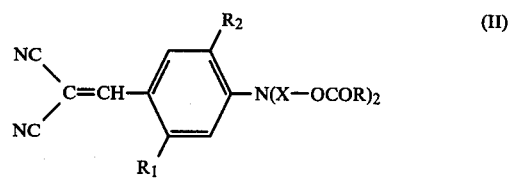

in which $R_1$, $R_2$ and X have the meaning indicated for the formula (I) and

R denotes alkyl or aryl, are hydrolysed with mineral acid to give compounds of the formula (I) and the latter are isolated.

The hydrolysis is preferably carried out in a temperature range between 55° and 80° C., for example in a mixture of water and an organic solvent or in an organic solvent. Suitable organic solvents are preferably, but not exclusively, low alcohols, such as methanol or ethanol. Examples of suitable acids are hydrochloric acid and sulphuric acid. To ensure a quantitative hydrolysis, for example when working in methanol, methyl acetate can be distilled off toward the end of the reaction. The isolation of dyestuffs of the formula (I) can be effected, for example, by diluting the reaction solution with water or by distilling off the solvent. The acid treatment does not alter the dyestuff molecule in any other undesirable way.

The process according to the invention, compared to previously known preparation processes for dyestuffs of the formula (I), has the advantage of considerably higher yields. The products are obtained in high purity and need not be freed from metal salts by means of expensive purification operations. Dyestuffs prepared by the process according to the invention are suitable without further purification, for example for use in incorporation into polyurethane plastics. Compared to previously known preparation processes, the loading of effluent by iron salts or zinc salts is also eliminated. The new process is therefore suitable for the preparation of dyestuffs (I) on an industrial scale.

Using aniline derivatives as starting materials, dyestuffs of the formula (I) can now be prepared by converting compounds of the formula

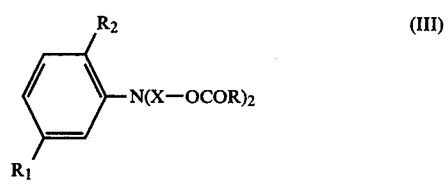

in which $R_1$ and $R_2$ denote hydrogen, alkyl, alkoxy or halogen,

R denotes alkyl or aryl and

X denotes alkylene, by the Vilsmeier reaction into aldehydes of the formula

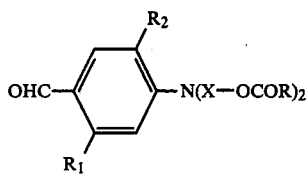

in which

R, $R_1$, $R_2$ and X have the meaning indicated for the formula (III), and reacting the aldehydes with malonic dinitrile to give compounds of the formula

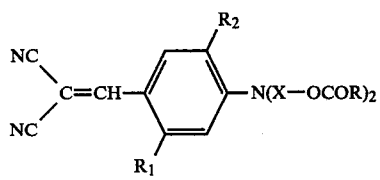

which are hydrolysed by means of mineral acid in the manner indicated above to give compounds of the formula

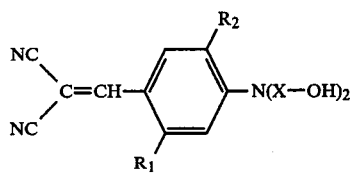

which are isolated.

A particular embodiment of the process according to the invention consists in preparing the dyestuffs (I) without intermediate isolation of the aldehydes and/or of compounds of the formula (II).

The conversion of compounds of the formula (III) into the aldehydes (IV) by the Vilsmeier reaction is effected by known processes by means of a formylation agent and, for example, phosphorus oxychloride (compare Houben-Weyl, Methoden der organischen Chemie [Methods of Organic Chemistry], volume 7/1, pages 29–32, 1954).

The condensation of the aldehydes (IV) with malonic dinitrile is preferably carried out at temperatures between 40° and 100° C., particularly preferably within the range 50° to 80° C., in a mixture of water and an organic solvent or in an organic solvent. Examples of suitable organic solvents are alcohols such as methanol, ethanol, the propanols and butanols, $C_2$- to $C_4$-glycols, dimethylformamide and others. To accelerate the condensation reaction basic catalysts can be added, such as, for example, ammonia, triethylamine, pyridine, piperidine, N-ethylpiperidine, N-methylmorpholine, alkali metal carbonates, alkali metal acetates and acetates of inorganic or organic nitrogen bases, such as, for example, ammonium acetate or piperidine acetate.

In the mentioned particular embodiment of the process, in which the dyestuffs (I) are prepared without intermediate isolation of the aldehydes (IV) and/or of compounds (II), the procedure is, for example, as follows:

After the Vilsmeier mixture has been discharged onto water, a phase separation is carried out at a pH value of about 5.5–6.5 and a temperature of about 50° C. and the salts and by-products of the Vilsmeier reaction are thereby removed in the aqueous phase. The organic phase can then be employed directly in the later synthetic steps. However, it is likewise also possible to isolate the aldehydes of the formula (IV) from the organic phase.

In the formulae (I), (II), (III) and (IV):

$R_1$ and $R_2$ preferably denote hydrogen, $C_1$–$C_4$-alkyl, in particular methyl and ethyl, $C_1$–$C_4$-alkoxy, in particular methoxy and ethoxy, and Cl, R preferably represents $C_1$–$C_4$-alkyl and phenyl, particularly preferably methyl, and X preferably represents $C_1$–$C_4$-alkylene, in particular —$CH_2$—$CH_2$—; the OH group in the alkylene radical is preferably in the 2-position.

Of particular importance is the new process for the preparation of compounds of the formula

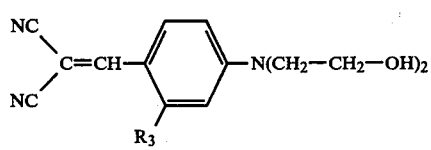

in which $R_3$ denotes hydrogen or methyl.

EXAMPLE 1

279 g of N,N-bis-(2-acetoxyethyl)-3-methylaniline are dissolved in 250 ml of incipiently distilled DMF. 135 ml of phosphorus oxychloride are added in the course of 2 hours at a temperature of about 40° C. The mixture is stirred for 6 hours at 60° C.; thereafter it is allowed to cool down and the solution is discharged at 30° C. onto 1,000 ml of ethanol. 300 ml of a 25% strength aqueous ammonia solution as well as 66 g of malonic dinitrile are added, and the condensation reaction is carried out for 5 hours at 70° C. After cooling down to 10° to 20° C., the resulting precipitate is filtered off with suction. About 600 g of a moist paste having a solids content of about 50% of a dyestuff of the formula

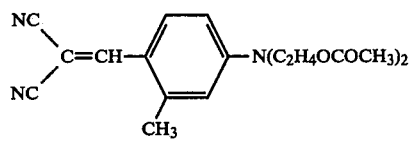

are obtained.

EXAMPLE 2

600 g of a moist paste (solids content about 50%) of the dyestuff obtained according to Example 1 are added to 800 ml of ethanol, the resulting mixture is heated with stirring to 75° C., and 300 ml of 37% strength hydrochloric acid are then run in as rapidly as possible. The mixture is then boiled for 30 minutes under reflux. Thereafter the solution is allowed to cool down to about 60° C. and then discharged with stirring onto a mixture of 2,500 g of ice and 1,000 ml of water. The resulting precipitate is filtered off with suction, washed with water and dried. 240 g of a dyestuff of the formula

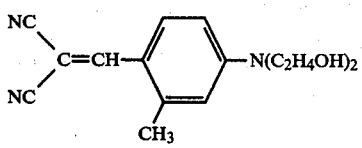

are obtained. The yield, starting from N,N-bis-(2-acetoxyethyl)-3-methylaniline, is calculated to be 88% of theory.

EXAMPLE 3

600 g of a 50% strength moist paste of the dyestuff obtained according to Example 1 are added to 500 ml of methanol, the resulting mixture is heated with stirring to about 55° C. and 75 g of HCl gas are passed in in the course of about 30 minutes. During this period, the suspension warms to the reflux temperature of the methanol. Toward the end of the reaction, the product dyestuff dissolves. The mixture is further stirred for another 15 to 20 minutes at a temperature above 55° C.; the solution is then allowed to cool down to about 45°–50° C. and discharged with stirring onto a mixture of 2,000 g of ice and 500 ml of water. The resulting precipitate is filtered off with suction, washed and dried. 245 g of the dyestuff also obtained according to Example 2 are obtained. The yield is 90% of theory, calculated on the basis of the amount of N,N-bis-(2-acetoxyethyl)-3-methylaniline employed.

EXAMPLE 4

600 g of a 50% strength moist paste of the dyestuff obtained according to Example 1 are added to 500 ml of methanol, the mixture is heated with stirring to about 55° C., and 75 g of HCl gas are passed in in the course of about 30 minutes. During this period, the suspension warms up to the reflux temperature of the methanol. The mixture is further stirred for about 20 minutes at a temperature above 55° C. Thereafter, a weak vacuum is applied and about 180 ml of a mixture of methyl acetate and methanol are distilled off at a bottom temperature of 60° C. 2,000 ml of warm water at 60° C. are added, and the resulting mixture is allowed to cool with stirring to about 20° C. The resulting dyestuff is filtered off with suction, washed with water and dried. 255 g of the dyestuff also obtained according to Example 2 are obtained. The yield corresponds to 94% of theory.

EXAMPLE 5

265 g of N,N-bis-(2-acetoxyethyl)-aniline are converted analogously to Example 1 into a dyestuff of the formula

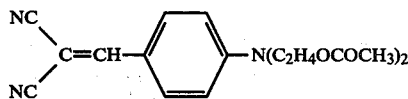

This dyestuff is treated as indicated in Example 4 with HCl. 235 g of a dyestuff of the formula

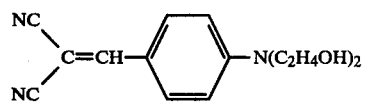

are isolated. The yield corresponds to 91.5% of theory.

EXAMPLE 6

279 g of N,N-bis-(2-acetoxyethyl)-3-methylaniline are dissolved in 210 g of incipiently distilled DMF. 182 g of phosphorus oxychloride are added in the course of about 3 hours at such a rate that the temperature increases from initially about 40° C. to 50°–55° C. In order not to exceed the temperature of 50°–55° C., the mixture is cooled. It is then heated in the course of 1 hour to 70°–75° C. and maintained for 6 hours at this temperature. It is then cooled down to about 50° C., and the reaction solution is discharged with stirring and cooling at 40°–45° C. onto 500 g of water. During this step, the pH value is maintained between 4.5 and 5.5 by the simultaneous addition of about 325 g of 50% strength sodium hydroxide solution. At the end, the temperature is allowed to rise to 50° C. and the pH value is brought to 5.5. At 50° C., the stirrer is switched off and the phases are allowed to separate. The turbid, brownish, highly mobile bottom phase is then separated from the viscous dark top layer which contains the aldehyde. 280 g of methanol are added to the oil phase, and the pH value is adjusted to 5.0–5.5 by means of about 14 g of anhydrous sodium acetate. 68 g of malonic dinitrile are then added. The mixture is heated in the course of 1 hour to 60° C. and then stirred for 6 hours at 60°–65° C. After the condensation is complete, the mixture is cooled down to 50°–55° C. and 66.5 g of hydrogen chloride gas are passed in at this temperature with slight cooling in the course of about 1 hour. Thereafter, a weak vacuum is applied and about 150 g of a mixture of methyl acetate and methanol are distilled off at a bottom temperature of 60°–65° C. Thereafter, the total volume of the mixture is raised to 1,400 ml by means of hot water at about 60° C., the dyestuff being dispersed as a melt. The mixture is then cooled down to about 25° C. by means of external cooling. This causes all of the dyestuff to crystallise in the form of a granulate. The pH value is then adjusted to 2.5 with cooling at about 30° C. by the addition of about 145 g of 50% strength sodium hydroxide solution; the mixture is then cooled down to 5° C., and the dyestuff of the formula

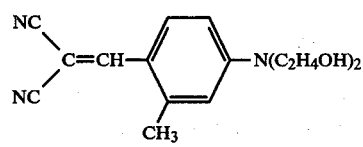

is filtered off with suction. The press cake is washed with about 900 ml of ice water until salt-free. About 300 g of a moist paste are obtained; after drying in a vacuum oven at 50° C., 260 g of pure dyestuff, corresponding to 96% of theory, are obtained.

We claim:
1. Process for the preparation of styryl dyestuffs of the formula

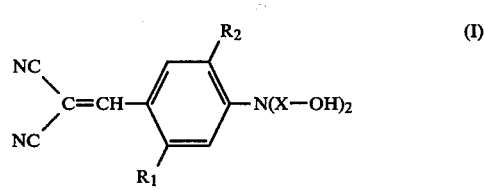

in which
- $R_1$ and $R_2$ denote hydrogen, alkyl, alkoxy or halogen and
- X denotes an alkylene radical, characterised in that compounds of the formula

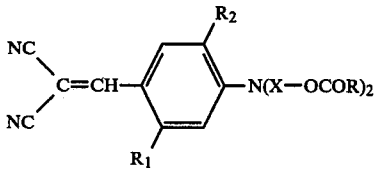
(II)

in which
- X, $R_1$ and $R_2$ have the meaning indicated for formula (I) and
- R denotes alkyl or aryl, are hydrolysed by means of mineral acid to give compounds of the formula (I) and the latter are isolated.

2. Process according to claim 1, characterised in that the hydrolysis is carried out at 55°–80° C. in a mixture of water and an organic solvent or in an organic solvent.

3. Process for the preparation of styryl dyestuffs of the formula

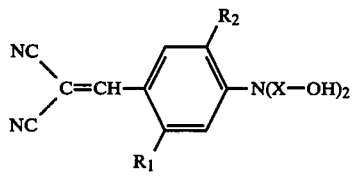
(I)

in which
- $R_1$ and $R_2$ denote hydrogen, alkyl, alkoxy or halogen and
- X denotes an alkylene radical, characterised in that compounds of the formula

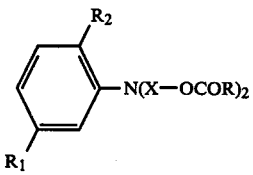
(III)

in which
- X, $R_1$ and $R_2$ have the meaning indicated for formula (I) and
- R denotes alkyl or aryl, are converted by the Vilsmeier reaction into aldehydes of the formula

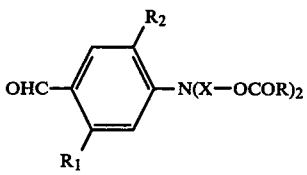
(IV)

in which
- X, R, $R_1$ and $R_2$ have the meaning indicated for formula (III)

and the aldehydes are reacted with malonic dinitrile to give compounds of the formula

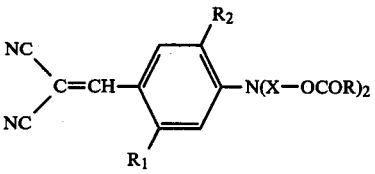
(II)

in which
- X, R, $R_1$ and $R_2$ have the meaning indicated for formula (III)

and the latter compounds are further processed in accordance with claim 1.

4. Process according to claim 3, characterised in that dyestuffs of the formula (I) are prepared without intermediate isolation of compounds (II).

5. Process according to claim 1, for the preparation of dyestuffs of the formula (I) in which
- $R_1$ and $R_2$ denote hydrogen, $C_1$–$C_4$-alkyl, in particular methyl and ethyl, $C_1$–$C_4$-alkoxy, in particular methoxy and ethoxy, and chlorine and
- X denotes $C_1$–$C_4$-alkylene, in particular —$CH_2$—$CH_2$—, the OH group in the alkylene radical being in the 2-position.

6. Process according to claim 1 for the preparation of dyestuffs of the formula

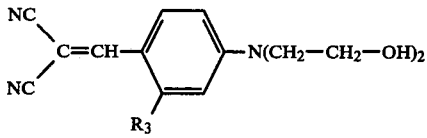
(V)

in which
$R_3$ denotes hydrogen or methyl.

7. Process according to claim 1, characterised in that R denotes methyl.

8. Process according to claim 3, characterized in that dyestuffs of the formula (I) are prepared without intermediate isolation of aldehydes (IV) by discharging the Vilsmeier reaction onto water and carrying out a phase separation employing the organic phase directly in the reaction with malonic dinitrile.

9. A process according to claim 1 wherein R is $C_1$ to $C_4$ alkyl or phenyl.

10. A process according to claim 3 wherein R is $C_1$ to $C_4$ alkyl or phenyl.

11. A process according to claim 10 wherein R denotes methyl.

12. A process according to claim 1 wherein the hydrolysis is carried out at a temperature in a range between 55° and 80° C. in a mixture of water and an organic solvent and said organic solvent is methanol and ethanol employing hydrochloric acid or sulfuric acid as the mineral acid.

* * * * *